United States Patent [19]
Webb

[11] 4,096,712
[45] Jun. 27, 1978

[54] CONTROL COUPLINGS AND GEARING COMBINED THEREWITH

[75] Inventor: Oswald Webb, Coventry, England

[73] Assignee: GKN Transmissions Limited, Birmingham, England

[21] Appl. No.: 660,075

[22] Filed: Feb. 23, 1976

[30] Foreign Application Priority Data

Feb. 25, 1975 United Kingdom ............... 7757/75

[51] Int. Cl.² .............. F16D 3/80; F16H 1/44; F16D 19/00; F16D 31/00
[52] U.S. Cl. .................................. 64/26; 74/711; 188/276; 192/58 B; 192/82 T
[58] Field of Search ............... 74/710.5, 711; 192/57, 192/58 A, 58 B, 58 C, 82 T; 188/268, 276, 290; 64/26

[56] References Cited

U.S. PATENT DOCUMENTS

| | | | |
|---|---|---|---|
| 1,238,447 | 8/1917 | Severy | 192/58 C |
| 2,532,656 | 12/1970 | Backus et al. | 188/276 |
| 2,743,792 | 5/1956 | Ransom | 192/58 B X |
| 2,775,317 | 12/1956 | Sinisterra | 188/290 X |
| 2,869,399 | 1/1969 | Miles | 74/711 |
| 2,955,472 | 10/1960 | Krupick et al. | 188/276 X |
| 3,211,022 | 10/1965 | Anderson | 74/711 |
| 3,228,494 | 1/1966 | Rumsey | 192/58 B X |
| 3,534,633 | 10/1970 | Chocholek | 74/711 |
| 3,760,922 | 9/1973 | Rolt et al. | 74/710.5 X |
| 3,869,940 | 3/1975 | Webb et al. | 74/711 |
| 3,907,079 | 9/1975 | Chapman | 192/58 B X |
| 4,022,084 | 5/1977 | Pagdin et al. | 74/711 |
| 4,040,271 | 8/1977 | Rolt et al. | 64/26 |

FOREIGN PATENT DOCUMENTS 624,762 8/1961 Canada ..................... 188/290

Primary Examiner—Samuel Scott
Assistant Examiner—Carl F. Pietruszka
Attorney, Agent, or Firm—Arnold, White & Durkee

[57] ABSTRACT

A control coupling, particularly for use with a differential gearing, the coupling including an enclosure containing a viscous liquid and first and second mutually interleaved sets of annular plates arranged for rotation about a common axis within the enclosure. The first set of plates are arranged to be connected with a first rotatable member and the second set of plates being arranged to be connected with a second rotatable member, and the plates of at least one set are free to move in directions parallel to the common axis. One of the sets of plates are mounted on a hollow hub which projects within the enclosure and which has a bore which is open to, and forms part of, the enclosure volume. A piston is slidable in this bore to vary the volume of the enclosure and springs are located in the bore to urge the piston towards a limit position in which the volume of the bore in communication with the remainder of the enclosure is at a minimum. The piston is displaceable against the spring, in response to increases in liquid pressure in the enclosure, to increase the volume of the enclosure.

12 Claims, 6 Drawing Figures

CONTROL COUPLINGS AND GEARING COMBINED THEREWITH

BACKGROUND OF THE INVENTION

This invention relates to control couplings for interconnection between first and second rotatable members to control relative rotation therebetween. The invention is also concerned with the combination of a control coupling with differential gearing to control relative rotation between members of the gearing. Such a combination of control coupling and differential gearing finds application in a four-wheel-drive vehicle between the driven axles thereof and also between the individual wheels of a driven axle of a vehicle.

More particularly the invention is concerned with a control coupling, hereinafter referred to as being of the kind specified, comprising first and second mutually interleaved sets of annular plates arranged for rotation about a common axis within an enclosure containing a viscous liquid in contact with adjacent surfaces of said plates, the first set of plates being arranged for driving connection with a first rotatable member and the second set of plates being arranged for driving connection with a second rotatable member.

It is known that, in control couplings of the kind specified, heat will be generated in the coupling due to shearing of the viscous liquid during relative rotation of the plates of the two sets. Increase in the temperature of the viscous liquid causes a decrease in its viscosity and consequently a decrease in the torque transmitting ability of the coupling. Moreover the effective viscosity of the viscous liquid is inversely proportional to the rate of shearing so that the torque transmitting ability of the coupling tends to decrease with increase in the speed of relative rotation of the two sets of plates. Thus, in known couplings of the kind specified, the torque transmitting characteristics of the coupling for any given constant speed-difference between the two sets of plates is such that over a period of a few minutes from start-up from rest, the value of torque transmitted reduces initially relatively rapidly and then more slowly.

In certain practical applications of couplings of the kind specified, the aforesaid torque transmitting characteristic constitutes a disadvantage in that the reducing torque value makes it difficult to achieve consistent control over the rotatable members connected to the sets of plates.

An object of the present invention is to provide a control coupling of the kind specified wherein the aforesaid disadvantage is obviated or mitigated.

SUMMARY OF THE INVENTION

According to the present invention, there is provided a control coupling of the kind specified in which: the plates of at least one set are free to move in directions parallel to said common axis; the plates of one set are mounted on a hollow hub which projects within the enclosure and which has a bore which is open to, and forms part of, the enclosure volume; a piston is slidable in the bore to vary the volume of the enclosure; and resiliently yieldable means are located in the bore urging the piston towards a limit position in which the volume of the bore in communication with the remainder of the enclosure is at a minimum; the strength of the resiliently yieldable means being chosen according to a desired torque transmitting characteristic for the coupling, and the quantity of viscous liquid within the enclosure being such that at an ambient temperature of 25° C and with the coupling at rest the viscous liquid occupies a volume in the range 85 to 100% of the volume of the enclosure when said piston is in said limit position.

There is a relationship between the torque transmitted and the pressure in the coupling. When the pressure in the coupling is caused by expansion of the viscous liquid on temperature rise during shearing of the liquid, and the plates of at least one set are free to move in directions parallel to the coupling axis, the torque developed is greater than would be predicted on the basis of known theory of viscous shear. Thus a considerable torque increase is obtained simultaneously with a marked rise in pressure. By way of explanation, it is thought that small inequalities in plate-to-plate spacing, due possibly to complex thermal gradients in the coupling, give rise to a pressure drop across pairs of groups of the plates. Thus, these plate pairs or groups may be caused, by the increasing pressure, to clutch and so augment the torque being produced by viscous shear alone. Pressure increase is controlled by movement of the piston against the resiliently yieldable means and therefore a desired torque transmitting characteristic may be obtained by making appropriate choice of the strength of the resiliently yieldable means.

The quantity of viscous liquid in the coupling at an ambient temperature of 25° C is between 85 and 100% of the minimum value of the enclosure volume, i.e., said volume when the piston is in its limit position. Thus, the whole of the enclosure will be full of liquid if the fill factor, that is the quantity of liquid in the enclosure, is 100% whereas if the fill factor is 85%, then 15% of the volume within the enclosure when the piston is in its limit position will be freed of liquid. The fill factor will affect the shape of the characteristic curves relating torque transmitted to time. Thus, if there is a free space within the enclosure at ambient temperature this will reduce the torque transmitted at the onset of relative speed difference between the plate sets. It is to be understood that such free space may be a vacuum or filled with air or a gas.

This is useful where the control coupling is associated with differential gearing, as described herein, since it prevents any substantial torque being transmitted when there are small differences in speed between members of the gearing which may occur in service.

Preferably, the resiliently yieldable means includes two or more spring means arranged so that the spring rate increases as the element moves away from its first limit position.

The piston preferably has a second limit position remote from the first-mentioned limit position and in which liquid from the enclosure can by-pass the piston. Thus it is envisaged that the piston will reach its second limit position at the predetermined maximum working temperature of the coupling, thus relieving pressure in the enclosure and preventing permanent damage thereto. Since fluid will permanently have escaped from the coupling however, the latter will have to be refilled.

When the piston is at its second limit position it may be in an enlargement of the bore in the hub so that liquid can flow around the piston and into the enlargement and escape from the enclosure.

The enclosure may comprise annular end walls connected by a tubular wall, to which the other set of plates are connected, and the hub preferably acts as a thrust member between the annular end walls.

According to a further aspect of the invention, the coupling is associated with differential gearing wherein two members of the gearing are connected respectively to the two sets of plates of the coupling.

The coupling thus controls the operation of the gearing. The gearing will normally have an input member and two output members and the coupling will be connected across the output members. Thus, if the differential gearing is between the wheels of a driven axle the coupling will be connected to the two outputs of the differential gearing, i.e., directly between the wheels of the driven axle. If the differential gearing is arranged as an inter-axle differential gearing in a four-wheel-drive vehicle then the coupling will be connected between the outputs of the differential gearing, i.e., the members of the differential gearing are connected to the two driven axles.

The differential gearing may be of the bevel gear type and one wall of the enclosure may be provided by part of one or the side gears of the differential gearing. The side gears will normally be the outputs of the gearing and the coupling will be connected between the side gears.

Alternatively, the differential gearing may be of the spur gear type in which the planet carrier is normally the input and the sun gear and the annulus gear are the outputs; in such a case the coupling will be connected between the sun gear and the annulus gear.

BRIEF DESCRIPTION OF THE DRAWINGS

The invention will now be described in detail by way of example with reference to the accompanying drawings, in which.

DESCRIPTION OF A PREFERRED EMBODIMENT

Figure 1:
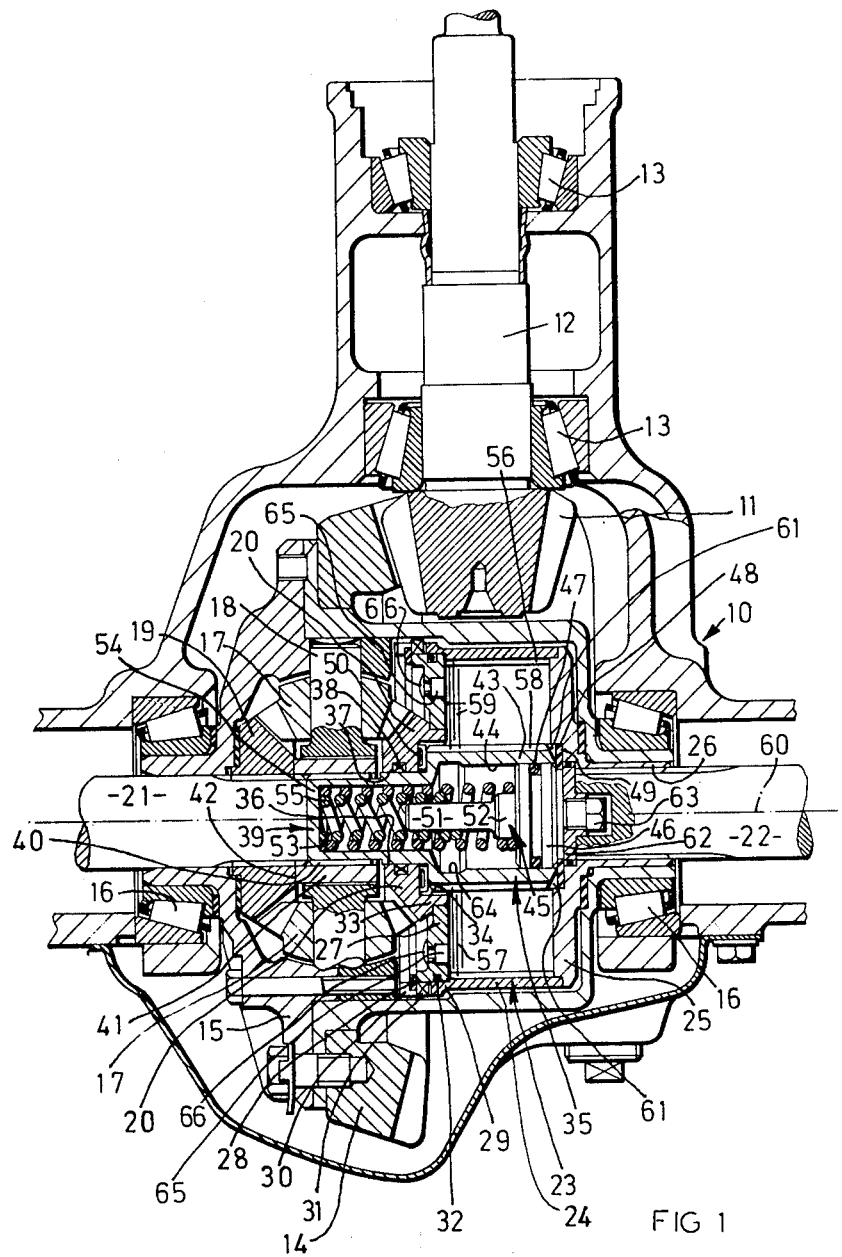
FIG. 1 is a sectional view of a control coupling of the kind specified embodying the invention and associated with a bevel gear differential gearing.

Referring now to FIG. 1, this shows the center part of a driven axle of a motor vehicle. The differential casing is indicated generally at 10 and mounted in the casing is a drive pinion 11 mounted on a shaft 12 received in pinion shaft bearings 13. The pinion 11 meshes with a crown wheel 14 which is bolted to a carrier 15. The carrier is rotatably supported in bearings 16 at opposite ends of the casing 10. The carrier supports a number of bevel positions, two of which are shown at 17, such pinions being rotatable on pins 18 supported in the carrier. The bevel pinions 17 mesh with side gears 19 and 20 which in turn are connected to half shafts 21 and 22. The connection of the half shaft 21 to the side gear 19 is conventional, merely being splined within the side gear, but the side gear 20 is associated with a control coupling which will now be described.

The control coupling comprises an enclosure indicated generally at 23. The enclosure includes a tubular wall 24 and a first annular end wall 25 which is provided with an internally splined boss 26 within which is received the half shaft 22. The end wall 25 is welded to the tubular wall 24. The enclosure has a second annular end wall 27 which is held in the tubular wall 24 between a circlip 28 and a shoulder 29. The walls 24 and 27 have interfitting teeth 30 and 31 respectively which engage to prevent relative rotation between the walls 24 and 27. A seal 32 seals the wall 27 in the wall 24.

The side gear 20 is provided with a boss 33 which is received in the central bore of the wall 27 and is welded therein. The boss is provided with a counter bore 34.

A hub indicated generally at 35 extends within the enclosure 23. The hub is hollow and has a first portion 36 which passes through a bore 37 in the side gear 20 and is sealed therein by means of a seal 38. The left hand end of the hub forms a second portion, is indicated at 39 and is externally splined at 40 to engage within an internally splined sleeve member 41 which is welded at 42 to the side gear 19. It will therefore be seen that the hub 35 is connected to the side gear 19 and thus to the half shaft 21 whereas the enclosure 23 is connected via the boss 26 to the half shaft 22. The control coupling is therefore active between the two half shafts 21 and 22.

Within the right hand part of the hub 35, which constitutes a third portion thereof and is indicated at 43, is formed a bore 44. Slidable in the bore is a piston indicated generally at 45. The piston has a head 46 which is grooved to receive an O-ring 47 which seals with the bore 44. The portion 43 of the hub extends between the annular walls of the enclosure and supports them against inward axial deflection. Thus, at the right hand end of the portion 43 there is a thrust washer 48 between the end of the portion and a shoulder 49 in a counterbore in the wall 25. A needle roller bearing 50 is received between the left hand end of the portion 43 and the base of the counterbore 34 in the side gear 20.

The piston 45 has a first shank portion 51 and a second shank portion 52. The shank portion 51 is of lesser diameter than the shank portion 52. A first spring 53 surrounds the shank portions and engages the shank portion 52 and the head 46 at one end and engages the end wall 54 of the second portion 39 of the hub at its other end. A second spring 55, of smaller diameter than the spring 53 and received within it, surrounds the left hand part of the shank portion 51. The spring 53 urges the piston 45 to the right in the drawing and the right hand of the piston engages the thrust washer 48. This is the first limit position of the piston. The springs 53 and 55 constitute resiliently yieldable means acting on the piston 45.

The inner surface of the tubular wall 24 is splined at 56 and mounted on the splines are a series of annular plates, one of which is shown at 57. The external surface of the portion 43 of the hub is also splined at 58 and carries annular plates, two of which are shown at 59.

Figure 2:
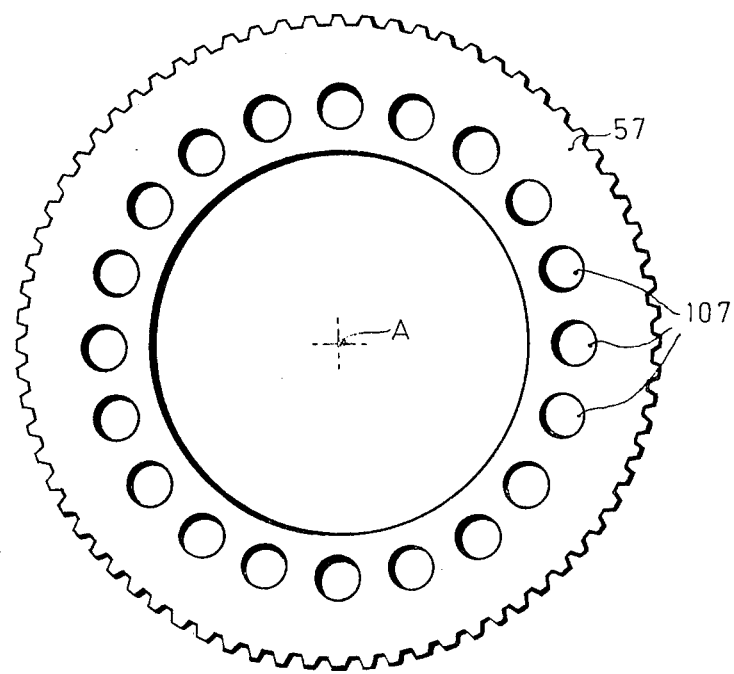
FIGS. 2 and 3 are, respectively, views showing the shape and configuration of annular plates of the two sets used in the control coupling of FIG. 1 to a larger scale than in FIG. 1.
Figure 3:
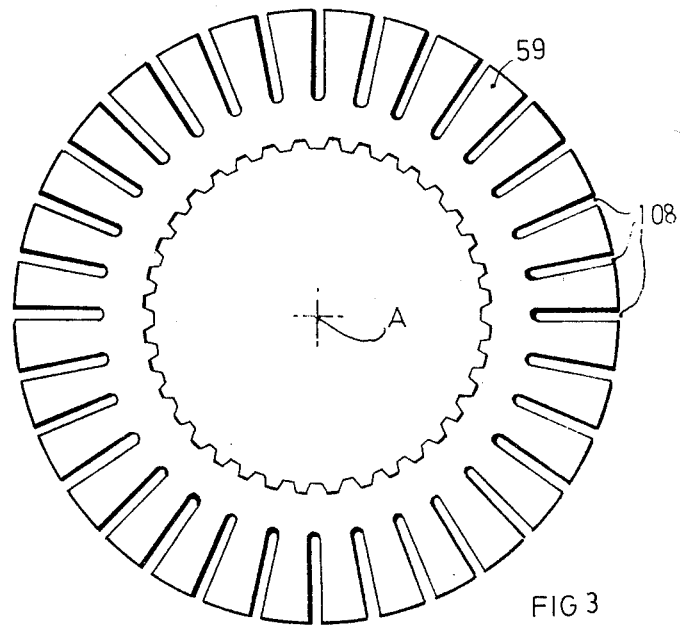

The shape and configuration of the plates 57, 59 are shown in FIGS. 2 and 3 respectively. The plates 57, being externally notched for engagement with the tubular wall 24, may be conveniently termed "outer" plates; and the plates 59, being internally notched for engagement with the portion 43 of the hubs termed "inner" plates. The outer plates 57 have through openings in the form of holes 107 arranged around common axis of rotation of the plates indicated at 60. The inner plates 59 have through openings in the form of radial slots 108. These holes and slots not only facilitate the introduction of viscous liquid into the enclosure, but also improve the performance of the control coupling in respect of its torque-transmitting capacity. The plates 57 and 59 are of mild steel and are preferably surface hardened, for example nickel plated. The plate-to-plate spacing when all the plates are equally spaced is of the order of 0.012 inch.

The two sets of plates, i.e., the plates splined to the annular wall 24 and the plates splined to the hub 35 are interleaved as indicated and the plates of both sets are free to move parallel to the common axis of rotation of the plates. The space between the portion 43 of the hub and the tubular wall 24 communicates with the bore 44 of the hub through slots 61 in the right hand end of the hub which engages the thrust washer 48. A plug 62 is sealed in the annular wall 25 and is provided with a removable plug 63.

The left hand end of the bore 44 is provided with an enlargement 64 and, as will be described below, when the piston has moved to the left such that the head 46 is in the enlargement 64, liquid can flow around the piston from the right to the left thereof and can escape from the enclosure by passages, not shown. The part of the bore 44 to the right of the piston forms part of the volume of the enclosure 23.

The enclosure is filled, or substantially filled, with viscous liquid, preferably a silicone oil. The liquid may have, for example, a nominal viscosity of 100,000 centistokes at an ambient temperature of 25° C and at zero shear rate. However, liquids having viscosities within the following range are usual, i.e., between 1,000 and 150,000 centistokes at zero shear rate and an ambient temperature of 25° C. The liquid is introduced into the coupling through openings 65 in the annular wall 27 while vacuum is applied to the enclosure through the aperture provided by removing the plug 63. When the desired amount of liquid has entered into the enclosure, the openings 65 are sealed by pop rivets 66 and the plug 63 is returned to position in the plug 62. The fill factor of the coupling, i.e., the quantity of fluid in the enclosure 24, including that part of the bore 44 to the right of the piston, at an ambient temperature of 25° C and with the coupling at rest is between 85 and 100% by volume.

The coupling is received within the carrier 15 and since the enclosure 23 is connected via the boss 26 to the half shaft 22 while the hub 35 is connected via the sleeve 41 to the half shaft 21 the control coupling thus acts directly between the half shafts, i.e., between the output members of the differential gearing, the input to which is via the carrier 15.

In operation, the control coupling controls relative rotation between the half shafts 21 and 22. Thus, if one of the shafts tends to rotate relative to the other, some of the torque will be transmitted through the coupling to the shaft rotating at the lower speed. If, therefore, one of the driven wheels is slipping while the other is on a dry surface, torque will be transferred through the coupling to the wheel on the dry surface which will help to extricate the vehicle.

As relative rotation takes place between the hub 35 and the enclosure 24 heat will be generated in the coupling due to energy dissipation therein. This heat will have two effects, firstly it will cause the viscous liquid to expand and secondly it will reduce the viscosity thereof. The expansion of the viscous liquid increases the pressure within the enclosure and the piston 45 is moved to the left by this increase in pressure. The rate of movement of the piston is controlled, firstly, by the spring 53 until the piston moves toward the left hand end of its stroke whereupon the spring 55 also comes into operation. The arrangement is such that, at a predetermined maximum working temperature, the expansion of the liquid will have been such that the piston 45 will have moved to the left until the head 46 is within the enlargement 64. To prevent permanent damage of the coupling, fluid can now flow past the piston into the enlargement and can leave the coupling and pass into the differential casing through passages not shown. While this wll impair the operation of the coupling and the latter will require refilling, permanent damage to the coupling will have been prevented.

The spring 55 is arranged to come into operation shortly before the maximum working temperature has been reached, i.e. shortly before the pressure in the coupling is relieved by the fluid flowing around the head 46 in the enlargement 64.

A coupling has been described in which both sets of discs 57 and 59 are slidable parallel to the axis 60. However, it is sufficient if only one set of elements are thus movable.

The strength of the springs are so chosen as to control the pressure rise and thus the torque characteristics of the coupling as will be described below. Preferably the piston will not move from its right-hand limit position until the pressure in the enclosure exceeds 10 p.s.i..

The strength of the springs 53, 55 in FIG. 1 and the fill factor of the coupling are chosen according to a desired torque transmitting characteristic having regard to the explanations given later herein with reference to the graphs of FIGS. 4 to 6. Other variables such as the liquid nominal viscosity, the initial nominal plate-to-plate spacing and general dimensions are determined on the basis of known data on viscous shear couplings, but modified as required by the novel teaching of the present invention.

Figure 4:
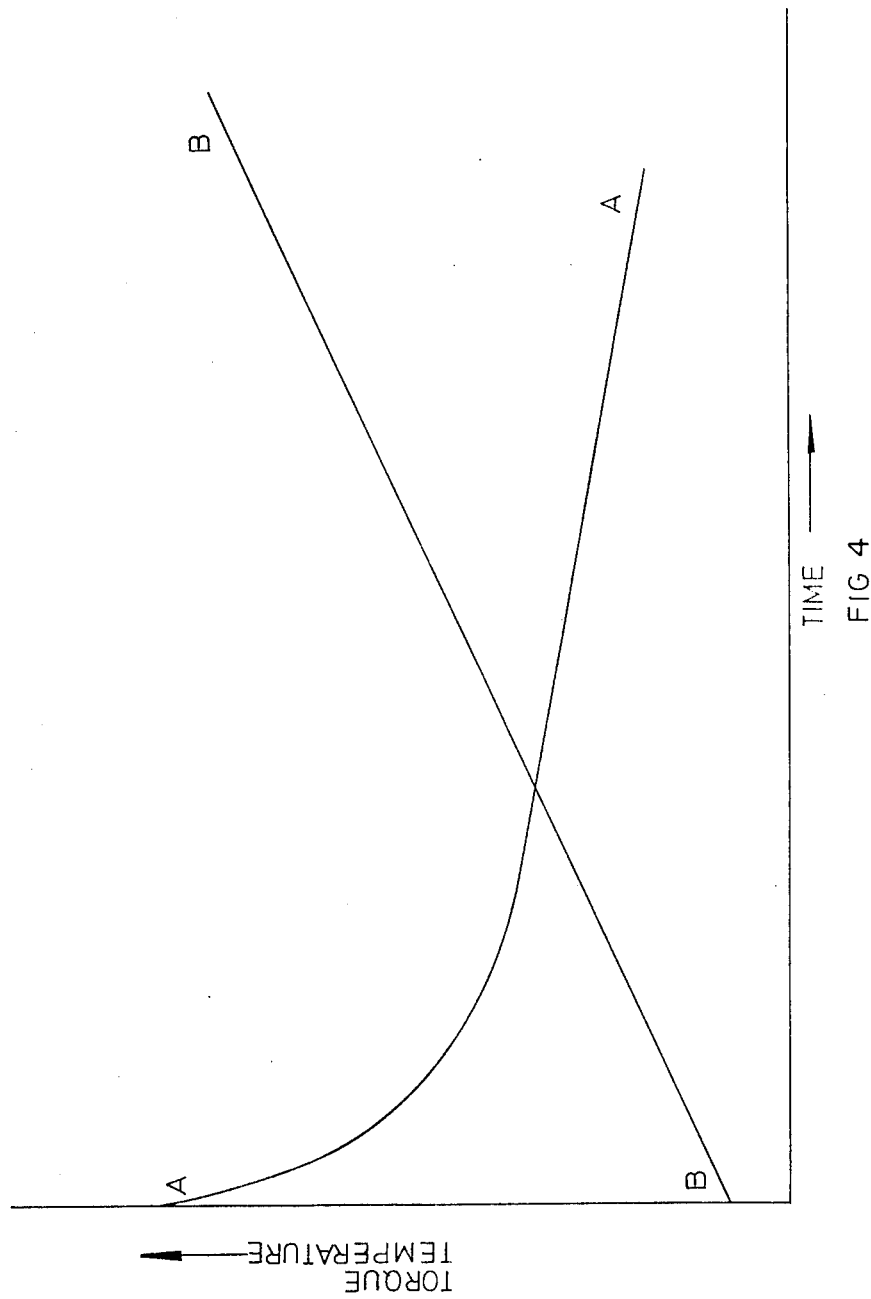
FIGS. 4 to 6 show various graphs illustrating generally certain relationships between time (abscissa) and torque, pressure or temperature (ordinate).

In FIG. 4, Graph A—A shows the general nature of the relationship between torque transmitted and time for a known control coupling of the kind specified when the coupling is operated with a steady or constant speed difference between the two sets of plates. Graph B—B indicates the relationship between the average temperature of the coupling and time. From Graph A—A, it can be seen that the transmitted torque falls initially, i.e., from the start of relative rotation between the plates, relatively rapidly and then more slowly while the averge temperature of the coupling increases steadily. Heat generated due to shearing of the viscous liquid during relative rotation of the two sets of plates increases the temperature of the viscous liquid thus reducing the effective viscosity and therefore the torque-transmitting ability of the liquid.

Figure 5:
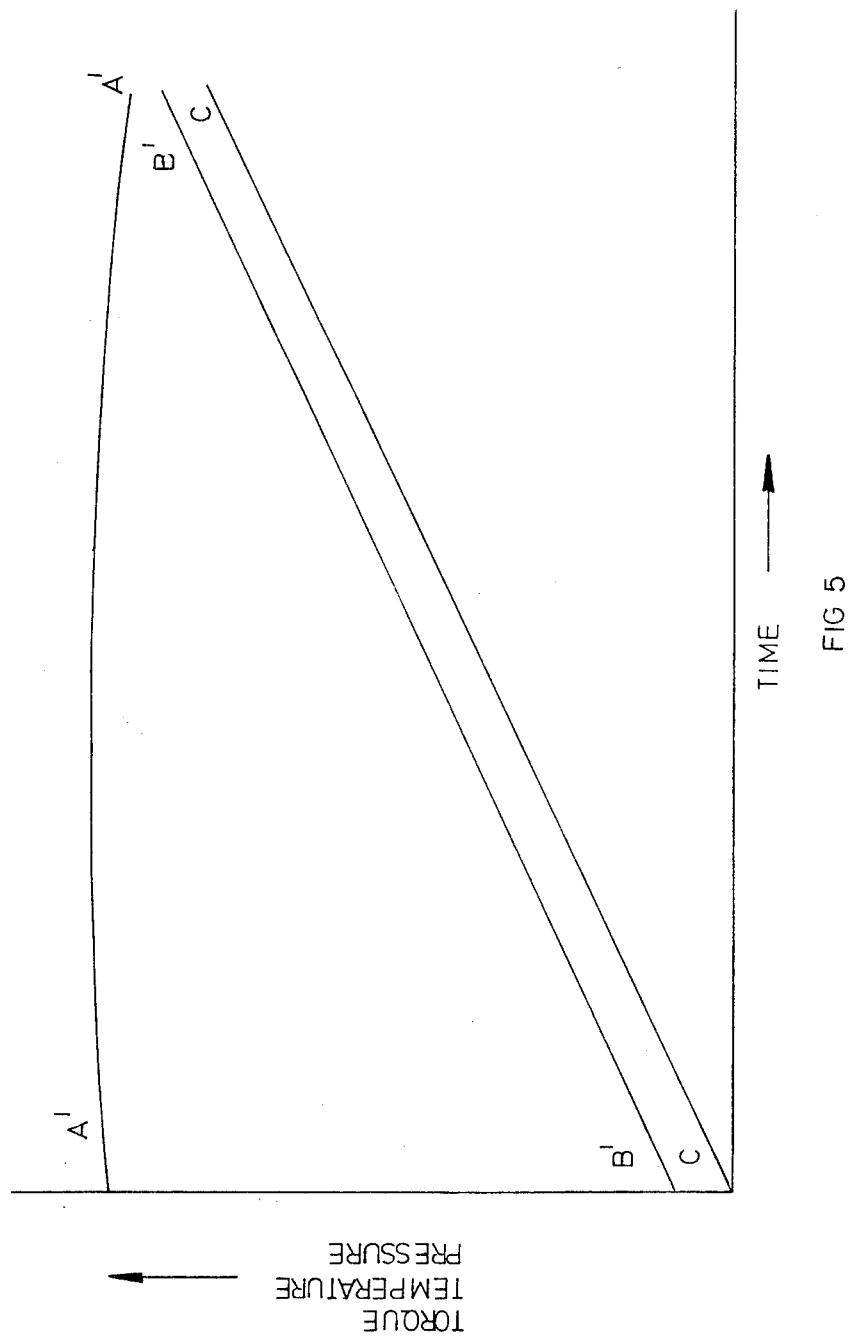

In FIG. 5 Graph A'—A' shows the general nature of the relationship between torque transmitted and time for a control coupling embodying the invention, the coupling being again operated with a constant speed difference between the two sets of plates. In this case, the fill factor is 100% that is to say the viscous liquid occupies all of the space available for fluid within the enclosure when the piston 45 is at its right-hand limit position at an ambient temperature of 25° C. Graph B'—B' indicates the relationship between the average temperature of the coupling and time, and Graph C—C indicates the fluid pressure in the enclosure measured through a tapping. From Graph A'—A' it can be seen that the transmitted torque remains substantially constant while the parameters of temperature and pressure steadily increase. As in the case of FIG. 4, heat generated lowers the effective viscosity and the torque-transmitting ability of the viscous liquid. However, in the case of FIG. 5, differential expansion between the viscous liquid and the material of the enclosure produces within the enclosure an immediate pressure build-up the magnitude of which is determined by the strength of the springs 53, 55. As previously explained herein, torque transmission attributable to viscous shearing alone is augmented by plate-to-plate clutching under pressure. Thus, by experiment, a strength of springs 53, 55 may be found that will provide torque augmentation by pressure clutching sufficient to compensate for torque loss due to reduced viscosity.

Figure 6:
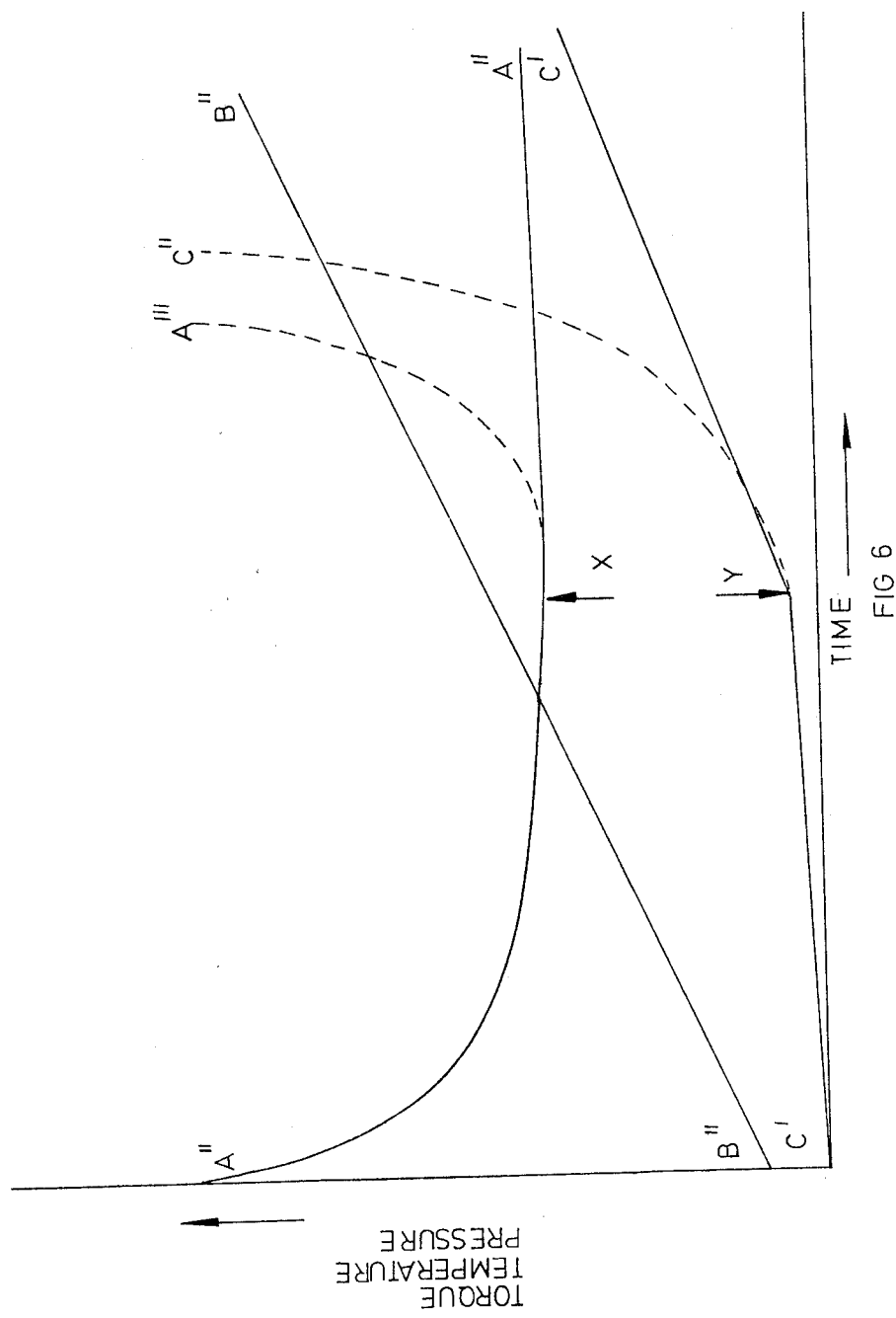

In FIG. 6, Graph A″—A″ shows the general nature of the relationship between torque transmitted and time for a control coupling embodying the invention, the coupling being again operated with a constant speed difference between the two sets of plates. In this case, the fill factor is 90%. Graphs B″—B″ and C′—C′ show the temperature/time and pressure/time characteristics as before. From graph A″—A″ it can be seen that the torque transmitted initially falls relative rapidly and then steadies to a substantially constant value at a point X. Corresponding with the point X on the time scale (abscissa), there is a point Y on the pressure characteristic C′—C′. Up to the point Y on the pressure characteristic, the relatively small pressure rise is due to compression of the air in the initial 10% air space within the enclosure resulting from differential expansion between the viscous liquid and the material of the enclosure. At the point Y, continued differential expansion brings into play the springs 53, 55 the strength of which, in this case, is chosen to provide torque augmentation by plate-to-plate clutching sufficient to compensate for further torque reduction due to reducing viscosity.

By way of further explanation, the effect of fixing the piston 46 at its right-hand limit position (which is the equivalent of the springs 53, 55 having infinite strength) is shown in FIG. 6 by Graphs A‴—A‴ and C′—C″. In this case, a rapid torque increase occurs simultaneously with a rapid pressure build-up from points X and Y on the torque and pressure characterisitics respectively. It may therefore be appreciated that the shape of the torque characteristic to the right of point X can be "tailored" to meet desired requirements by appropriate choice of spring strength; and to the left of point X can be tailored by appropriate choice of fill factor. In this context, it may be noted that in the case of FIG. 5, where the fill factor is 100% the point X may be regarded as lying on the ordinate. It is envisaged that both over-and under-compensation for torque reduction due to reduced viscosity may be achieved by appropriate choice of spring strength. In the context of this specification, reference to "spring strength" is to be taken as envisaging the possibility that variable rate springs may be used.

The reference herein to "plate-to-plate clutching" are to be regarded as including two possibilities. The first possibility is that torque augmentation is attributable to direct or "dry" frictional contact between adjacent plates. The second possibility is that torque augmentation is produced by a clutching effect while there exists between adjacent plates an extremely thin film of viscous liquid.

A control coupling of the kind specified and in accordance with the present invention may be associated either with an inter-axle or an inter-wheel differential gear in a motor vehicle transmission.

I claim:

1. A control coupling comprising an enclosure containing a viscous liquid; first and second mutually interleaved sets of annular plates arranged for rotation about a common axis within said enclosure with the viscous liquid in contact with adjacent surfaces of said plates, the first set of plates being arranged for driving connection with a first rotatable member and the second set of plates being arranged for driving connection with a second rotatable member; the plates of at least one set being free to move in directions parallel to said common axis; the plates of one set being mounted on a hollow hub which projects within the enclosure and which has a bore which is open to, and forms part of, the enclosure volume; a piston slidable in the bore to vary the volume of the enclosure; and resiliently yieldable means located in the bore urging the piston towards a limit position in which the volume of the bore in communication with the remainder of the enclosure is at a minimum; the strength of the resiliently yieldable means being chosen according to a desired torque transmitting characteristic for the coupling, and the quantity of viscous liquid within the enclosure being such that at an ambient temperature of 25° C and with the coupling at rest the viscous liquid occupies a volume in the range 85% to 100% of the volume of the enclosure when said piston is in said limit position.

2. A control coupling according to claim 1 wherein the viscous liquid has a nominal viscosity in the range 1000 to 150,000 centistokes.

3. A control coupling according to claim 2, wherein the viscous liquid is a silicone oil.

4. A control coupling according to claim 1 including means defining openings through the said surfaces of the plates.

5. A control coupling according to claim 4, wherein the means defining openings through the surfaces of the plates of one of said sets comprises a plurality of through apertures arranged around said common axis, and the means defining openings through the surface of the plates of the other of said sets comprises a plurality of open-ended slots arranged around said common axis.

6. A control coupling according to claim 1 wherein the resiliently yieldable means includes two or more spring means arranged so that the spring rate increases as the piston moves away from its limit position.

7. A control coupling according to claim 1 wherein the piston has a second limit position remote from the first-mentioned limit position and in which liquid from the enclosure can by-pass the piston.

8. A control coupling according to claim 7 in which the piston will reach its second limit position at a predetermined maximum working temperature of the coupling.

9. A control coupling according to claim 7 including an enlargment of the bore in the hub and wherein, when the piston is in its second limit position, it is located in said enlargment so that liquid can flow around the piston and into the enlargement and escape from the enclosure.

10. A control coupling according to claim 1 wherein the enclosure comprises annular end walls connected by a tubular wall to which the other set of plates are connected, the hub acting as a thrust member between the annular end walls.

11. A control coupling according to claim 1 in which the strength of the resiliently yieldable means is such as to allow the said piston to move away from said first-mentioned limit position only when fluid pressure within the enclosure exceeds a value of at least 10 p.s.i..

12. A control coupling according to claim 1 in combination with a differential gearing having an input member and two output members, one of said sets of plates being in driving connection with one of the said members of the gearing, and the other of said sets of plates being in driving connection with another of the said members of the gearing.

* * * * *

UNITED STATES PATENT AND TRADEMARK OFFICE
CERTIFICATE OF CORRECTION

PATENT NO. : 4,096,712
DATED : June 27, 1978
INVENTOR(S) : Oswald Webb

It is certified that error appears in the above-identified patent and that said Letters Patent are hereby corrected as shown below:

Column 3, line 20, delete "of one or" and insert therefor -- of one of --.

Column 3, line 55, delete "positions" and insert therefor -- pinions --.

Column 6, line 6, delete "wll" and insert therefor -- will --.

Column 8, line 49, delete "enlargment" and insert therefor -- enlargement --.

Signed and Sealed this

First Day of May 1979

[SEAL]

Attest:

RUTH C. MASON
Attesting Officer

DONALD W. BANNER
Commissioner of Patents and Trademarks